(12) United States Patent
Bremmer et al.

(10) Patent No.: US 9,776,385 B2
(45) Date of Patent: Oct. 3, 2017

(54) EXTERNAL TO BAGGING MECHANICAL CLAMP

(75) Inventors: Jonathan Bremmer, Glastonbury, CT (US); Jeffrey G. Sauer, III, Woodbury, CT (US); William E. Hovan, III, Oxford, CT (US); Christian A. Rogg, New Milford, CT (US); Paul H. Denavit, Woodbridge, CT (US); Robert A. Lacko, Oxford, CT (US); Neil W. Cawthra, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 531 days.

(21) Appl. No.: 13/080,398

(22) Filed: Apr. 5, 2011

(65) Prior Publication Data

US 2012/0255676 A1 Oct. 11, 2012

(51) Int. Cl.
*B32B 37/10* (2006.01)
*B29C 70/44* (2006.01)
*B29C 33/20* (2006.01)
*B29C 70/54* (2006.01)
*B32B 37/14* (2006.01)

(52) U.S. Cl.
CPC ............ *B32B 37/10* (2013.01); *B29C 33/202* (2013.01); *B29C 70/44* (2013.01); *B29C 70/443* (2013.01); *B29C 70/54* (2013.01); *B32B 37/1018* (2013.01); *B32B 37/146* (2013.01)

(58) Field of Classification Search
CPC ..... B32B 37/10; B32B 37/1018; B29C 70/44; B29C 70/342; B29C 70/443; B29C 66/81455; B29C 66/8266; B29C 66/82661

USPC ................................ 156/285, 286, 381, 382
See application file for complete search history.

(56) References Cited

U.S. PATENT DOCUMENTS

| 3,861,977 A | 1/1975 | Wiley |
| 4,681,651 A | 7/1987 | Brozovic et al. |
| 4,698,115 A | 10/1987 | Dodds |
| 4,704,240 A | 11/1987 | Reavely et al. |
| 4,853,172 A | 8/1989 | Jacaruso et al. |
| 5,354,195 A | 10/1994 | Dublinski et al. |
| 5,527,414 A | 6/1996 | Dublinski et al. |
| 5,665,301 A | 9/1997 | Alanko |
| 5,688,353 A | 11/1997 | Dublinski et al. |
| 5,793,024 A * | 8/1998 | Matsen .................. B21D 26/02 219/633 |
| 5,939,007 A | 8/1999 | Iszczyszyn et al. |
| 6,739,861 B2 | 5/2004 | Cournoyer et al. |
| 6,851,945 B2 | 2/2005 | Potter et al. |
| 6,899,339 B2 | 5/2005 | Sanders et al. |
| 7,622,066 B2 | 11/2009 | Brustad et al. |

(Continued)

FOREIGN PATENT DOCUMENTS

GB 2316036 A 2/1998
WO WO 2008148850 A1 * 12/2008

*Primary Examiner* — Christopher Schatz
(74) *Attorney, Agent, or Firm* — Cantor Colburn LLP

(57) ABSTRACT

A tool for forming a panel including a core area, at which plies sandwich a core, and a trim area surrounding the core, at which the plies are bonded together, is provided and includes a body having a surface on which the panel is formable, an assembly to apply bonding pressure to the plies at least at the core and trim areas and a clamping device external to the assembly to apply a clamping force to the vacuum bag and the plies.

11 Claims, 1 Drawing Sheet

(56) References Cited

U.S. PATENT DOCUMENTS

| | | | |
|---|---|---|---|
| 2002/0012591 A1* | 1/2002 | Montague | B29C 70/44 |
| | | | 416/241 R |
| 2004/0115299 A1 | 6/2004 | Potter et al. | |
| 2006/0017200 A1* | 1/2006 | Cundiff et al. | 264/511 |
| 2006/0062950 A1 | 3/2006 | Catella | |
| 2008/0083493 A1 | 4/2008 | Ridges et al. | |
| 2008/0182054 A1 | 7/2008 | Ridges et al. | |
| 2009/0305035 A1 | 12/2009 | Kaneko | |

\* cited by examiner

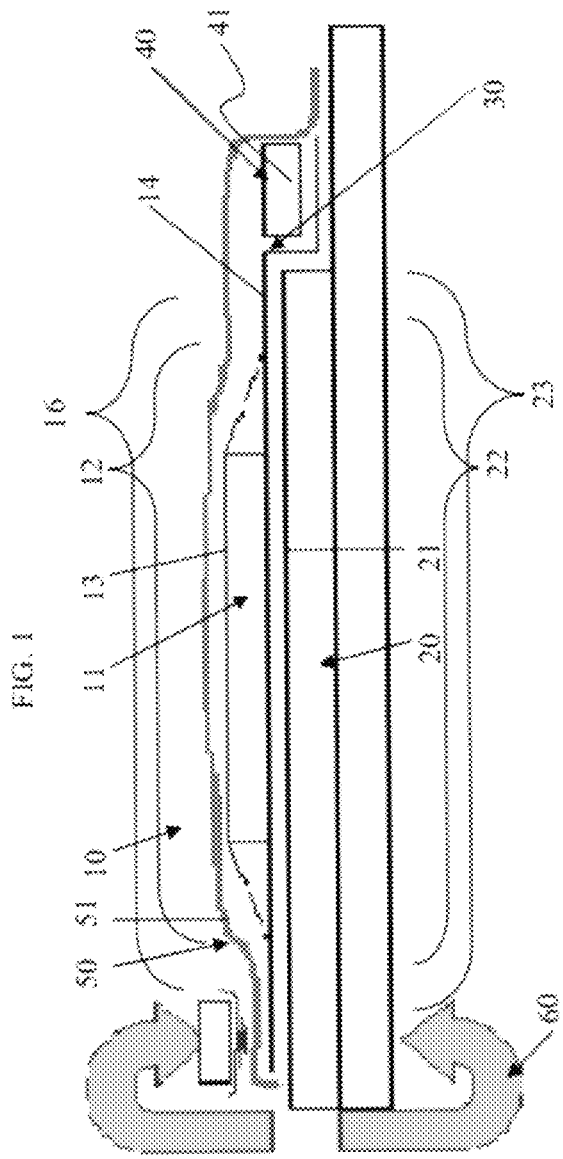

EXTERNAL TO BAGGING MECHANICAL CLAMP

FEDERAL RESEARCH STATEMENT

This invention was made with Government support under N00019-06-C-0081 awarded by the Department of the Navy. The Government has certain rights in this invention.

BACKGROUND OF THE INVENTION

The subject matter disclosed herein relates to an external to bagging mechanical clamp.

Core crushing is a problem with autoclave curing of honeycomb panels at higher pressures. Honeycomb panels are typically formed of materials used to increase panel stiffness and are configured with a core made of honeycomb-shaped cells and a ramp at the core periphery. During assembly, the core is placed onto a tool and sandwiched between upper and lower laminates, which are squeezed together by, for example, a vacuum bag. Core crushing occurs when the pressure applied by the vacuum bag overcomes a strength of the core material and crushes the core against the tool. The height of the core, the core ramp angle, the position of the core and the maximum expected operating pressure (MEOP) all play into non-crush versus core crush results.

In particular, core crush often occurs when one or both of the laminates is permitted to move relative to the other laminate during the pressurization. This ply/panel movement tends to be directed toward the center of the core at the center of the tool and increases a degree of pressurization at the center of the core. Therefore, efforts to avoid crush results have often been concerned with preventing ply/panel movement. These efforts have included manufacturer use of grip strips and/or manufactured inserts to resist ply/panel movement but require that additional ply/panel material be provided at additional costs.

BRIEF DESCRIPTION OF THE INVENTION

According to one aspect of the invention, a tool for forming a panel including a core area, at which plies sandwich a core, and a trim area surrounding the core, at which the plies are bonded together, is provided and includes a body having a surface on which the panel is formable, an assembly to apply bonding pressure to the plies at least at the core and trim areas and a clamping device external to the assembly to apply a clamping force to the vacuum bag and the plies.

According to another aspect of the invention, a tool for forming a panel including a core area, at which plies sandwich a core, and a trim area surrounding the core, at which the plies are bonded together, is provided and includes a body having a surface on which the panel is formable, the surface including core and trim portions for respective correspondence with locations of the core and trim areas of the panel, an assembly including a vacuum bag to apply bonding pressure to the plies at least at the core and trim areas and a clamping device external to the vacuum bag of the assembly to apply a clamping force to the vacuum bag and the plies.

According to yet another aspect of the invention, a method of forming a composite panel is provided and includes forming a tool surface, sandwiching a core between plies and placing the core and the plies on the tool surface such that the surface feature encompasses the core, disposing a vacuum bag atop an upper one of the plies and clamping the plies between the vacuum bag and the tool surface.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a side view of a tool for forming a panel; and

FIG. 2 is an enlarged view of the tool of FIG. 1.

The detailed description explains embodiments of the invention, together with advantages and features, by way of example with reference to the drawings.

DETAILED DESCRIPTION OF THE INVENTION

With reference to FIGS. 1 and 2, a tool 10 for forming a panel 11 is provided. The panel 11 includes a core area 12 at which an upper ply laminate 13 and a lower ply laminate 14 sandwich a core 15 and a trim area 16. The core 15 includes, for example, a central honeycomb panel or a panel formed of another cell arrangement and a ramped edge that is tapered along a periphery of the central honeycomb panel. The trim area 16 surrounds the ramped edge whereby, at the trim area, the upper and the lower ply laminates 13 and 14 have nothing interposed between them and are therefore able to be bonded together.

The tool 10 includes a body 20 having a surface 21 on which the panel 11 is formable. The body 20 includes a core portion 22 and a trim portion 23. The core portion 22 corresponds in location to a location of the core area 12 when the panel 11 components are disposed on the tool 10. Similarly, the trim portion 23 corresponds in location to a location of the trim area 16 when the panel 11 components are disposed on the tool.

With the tool 10 provided as described above, the lower ply laminate 14 may be disposed or laid upon the surface 21 and the core 15 may then be disposed on top of the lower ply laminate 14 such that a footprint or shape of the core 15 is encompassed within the core portion 22. The upper ply laminate 13 is then laid on the core 15 and the lower ply laminate 14 such that the upper ply laminate covers the core 15 and the lower ply laminate 14 at the core portion 22 and the lower ply laminate 14 at the inner region of the trim portion 23.

A border between the core portion 22 and the trim portion 23 may be formed to define a surface feature 30. The surface feature 30 may be localized on the surface 21 or may extend around the core portion 22 to surround the core 15. The surface feature 30, the core portion 22, the trim portion 23 and the core 15 may have similar or differing shapes. A lock 40 is disposable proximate to the surface feature 30 to increase a pre-bonding friction between the upper and lower ply laminates 13 and 14 at the surface feature 30. The lock 40 may be singular in number and may extend around and encompass the core 15 and/or the surface feature 30. Alternatively, the lock 40 may be localized and positioned proximate to only one part of the surface feature 30. In still other cases, the lock 40 may be composed of a plurality of local components that are arranged around the core 15 and/or the surface feature 30. In any case, the lock 40 may include a grip surface 41 to increase frictional engagement between the lock 40 and a surface of the upper ply laminate 13. A similar grip surface may be provided on the surface 21 as well.

For the step-down surface feature 30 of FIG. 1, the lock 40 will generally be disposed at a periphery of the surface feature 30 whereby a weight of the lock 40 will squeeze the upper and lower ply laminates 13 and 14, which are not initially bonded, together between the lock 40 and the surface 21 at the trim portion 23. Friction generated between the upper and lower ply laminates 13 and 14 is therefore increased significantly at the angular corners of the surface feature 30. This increased friction will tend to restrict relative movement of one of the upper and lower ply laminates 13 and 14 relative to the other during subsequent bonding operations and will thereby decrease a likelihood of a crush result. The restriction of the relative movement can be further increased by the use of the grip portion 41 and/or a similar grip portion provided on the surface 21.

Ply laminate bonding pressure is applied to the upper and lower ply laminates 13 and 14 and the lock 40 at the core area 12 and the trim area 16 and along the core portion 22 and the trim portion 23. In accordance with exemplary embodiments, an assembly 50 applies the ply laminate bonding pressure substantially evenly. The assembly 50 includes a vacuum bag 51 and a seal 52. The vacuum bag 51 is sealable via the seal 52 to the surface 21 and can be evacuated to apply the ply laminate bonding pressure substantially evenly. Due to the increased friction generated between the upper and lower ply laminates 13 and 14 by the effect of the squeezing effect of the lock 40 proximate to the surface feature 30, a likelihood that the substantially even ply laminate bonding pressure will cause relative movement between the upper and lower ply laminates 13 and 14 will be decreased.

In addition, an external to bagging mechanical clamping device 60 (hereinafter referred to as "clamping device 60") may be provided. The clamping device 60 is disposed external to the vacuum bag 51 and serves to increase laminate stability for the prevention of a core crush incident.

In operation, the clamping device 60 will locks the upper and lower ply laminates 13 and 14 in place on the tool 10 such that it will assist in stopping or at least preventing core crushing or ply movement during cure cycles. As a result, processing pressures can be increased leading to the panel 11 having better composite properties without increased defects associated with higher pressure cure cycles. The clamping device 60 may include low cost mechanisms that can be added to the tool 10 and that provide gripping through the normal autoclave bagging design processes and materials. The clamping device 60, as shown in FIGS. 1 and 2, may have point load capability 61 with a cushioned rubber sole 62 so as to apply a point load through the upper and lower ply laminates 13 and 14 such that the clamping device 60 locally increases the pressure to created a fixing force but does not risk damage to the vacuum bag 51.

As shown in FIGS. 1 and 2, the clamping device 60 may have c-shaped body 65 that clamps with upwardly directed force to a lower surface of the body 20 and with downwardly directed force to the vacuum bag 51. The clamping device 60 may apply that downwardly directed force at a point location but further may include the cushioned rubber sole 62 to at least locally spread out and/or cushion the downwardly directed force to thereby prevent vacuum bag 51 damage.

In an operation of the tool 10, the downwardly directed force provided by the clamping device onto the vacuum bag 51 must be greater than sideways directed forces (taking friction into account) applied to the upper and lower ply laminates 13 and 14 once the cure cycles begin so that movement between the plies is prevented or substantially reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool for forming a panel including a core area, at which plies sandwich a core, and a trim area surrounding the core, at which the plies are bonded together, the tool comprising:
   a body having an uppermost surface, the panel being formable on the uppermost surface at the core area and the uppermost surface defining a single plane above which the plies are disposed for bonding at the trim area where the core and trim areas are both defined along the single plane, the body further including a step-down surface feature laterally offset from the single plane;
   a lock arranged at the step-down surface, the lock being operable to secure the plies;
   an assembly including a vacuum bag to apply bonding pressure to the plies at least at the core and trim areas above the single plane, wherein the vacuum bag at least partially covers the lock; and
   a clamping device external to the assembly to apply at a tangentially localized spot at the trim area a spot load clamping force directly to the vacuum bag so that the vacuum bag in turn applies a corresponding spot load clamping force directly to the plies,
   a width of the tangentially localized spot in a circumferential dimension, which is defined around the core, extending only as a straight line from a first end of a partial arc-segment of the circumferential dimension to a second end of the partial arc-segment.

2. The tool according to claim 1, wherein the core comprises a central honeycomb panel and a ramped edge.

3. The tool according to claim 1, wherein the clamping device has a c-shaped body.

4. The tool according to claim 1, wherein the clamping device comprises a cushioned rubber sole.

5. A tool for forming a panel including a core area, at which plies sandwich a core, and a trim area surrounding the core, at which the plies are bonded together, the tool comprising:
   a body having an uppermost surface, the panel being formable on the uppermost surface at the core area and the uppermost surface including core and trim portions for respective correspondence with locations of the core and trim areas of the panel and defining a single plane above which the plies are disposed for bonding at the trim area where the core and trim areas are both defined along the single plane, the body further including a step-down surface feature laterally offset from the single plane;
a lock arranged at the step-down surface, the lock being operable to secure the plies;
an assembly including a vacuum bag to apply bonding pressure to the plies at least at the core and trim areas above the single plane, wherein the vacuum bag at least partially covers the lock; and
a clamping device external to the vacuum bag of the assembly to apply at a tangentially localized spot at the trim area a spot load clamping force directly to the vacuum bag so that the vacuum bag in turn applies a corresponding spot load clamping force directly to the plies,
a width of the tangentially localized spot in a circumferential dimension, which is defined around the core, extending only as a straight line from a first end of a partial arc-segment of the circumferential dimension to a second end of the partial arc-segment.

6. The tool according to claim 5, wherein the core comprises a central honeycomb panel and a ramped edge.

7. The tool according to claim 6, wherein the core portion encompasses the central honeycomb panel and the ramped edge in the plane thereof.

8. The tool according to claim 5, wherein the clamping device has a c-shaped body.

9. The tool according to claim 5, wherein the clamping device comprises a cushioned rubber sole.

10. The tool according to claim 9, wherein the cushioned rubber sole comprises:
a flat upper surface; and
an entirely convex lower exterior surface that contacts the vacuum bag at only the tangentially localized spot at an initial instant of an application of the spot load clamping force.

11. A tool for forming a panel including a core area and a trim area surrounding the core, the tool comprising:
plies disposed for ply bonding at the trim area and to sandwich the panel at the core area;
a body having an uppermost surface on which the panel is formable at the core area, the uppermost surface defining a single plane above which the plies are disposed for the ply bonding at the trim area where the core and trim areas are both defined;
along the single plane, the body further including a step-down surface laterally offset from the single plane;
a lock arranged at the step-down surface, the lock being operable to secure the plies;
an assembly including a seal and a vacuum bag, which is sealed by the seal, to apply bonding pressure to the plies at least at the core and trim areas above the single plane, wherein the vacuum bag at least partially covers the lock; and
a clamping device external to the assembly to apply a spot load clamping force directly to the vacuum bag so that the vacuum bag in turn applies a corresponding spot load clamping force directly to the plies between the seal and the core area and including a cushioned rubber sole, the cushioned rubber sole comprising:
a flat upper surface; and
an entirely convex lower exterior surface that is disposed to contact the vacuum bag at only a tangentially localized spot at the trim area at an initial instant of an application of the spot load clamping force,
a width of the tangentially localized spot in a circumferential dimension, which is defined around the core, extending only as a straight line from a first end of a partial arc-segment of the circumferential dimension to a second end of the partial arc-segment.

* * * * *